(12) United States Patent
Foster et al.

(10) Patent No.: US 7,056,246 B2
(45) Date of Patent: Jun. 6, 2006

(54) COMPLIANT CHAIN GUIDE WITH MULTIPLE JOINTS

(75) Inventors: Jeffrey Foster, Horseheads, NY (US); Mariano S. Garcia, Ithaca, NY (US)

(73) Assignee: BorgWarner INc., Auburn Hills, MI (US)

( * ) Notice: Subject to any disclaimer, the term of this patent is extended or adjusted under 35 U.S.C. 154(b) by 164 days.

(21) Appl. No.: 10/693,563

(22) Filed: Oct. 24, 2003

(65) Prior Publication Data

US 2005/0090346 A1    Apr. 28, 2005

(51) Int. Cl.
*F16H 7/08* (2006.01)
(52) U.S. Cl. ..................... 474/140; 474/111
(58) Field of Classification Search ............... 474/101, 474/100, 111, 139, 140, 144, 110
See application file for complete search history.

(56) References Cited

U.S. PATENT DOCUMENTS

| 4,672,805 A | * | 6/1987 | Moritz | 59/78.1 |
|---|---|---|---|---|
| 4,854,924 A | * | 8/1989 | Nagano | 474/140 |
| 5,427,580 A | | 6/1995 | Ledvina et al. | 474/84 |
| 5,647,812 A | * | 7/1997 | McDonald et al. | 474/111 |
| 5,665,019 A | | 9/1997 | Sheffer et al. | 474/11 |
| 5,779,582 A | | 7/1998 | Mott et al. | 474/140 |
| 5,779,583 A | * | 7/1998 | Nakatani et al. | 474/145 |
| 6,312,353 B1 | | 11/2001 | Oba | 474/140 |
| 6,322,471 B1 | | 11/2001 | Hashimoto | 474/140 |
| 2005/0090344 A1 | * | 4/2005 | Foster et al. | 474/111 |

FOREIGN PATENT DOCUMENTS

| JP | 8004848 | | 1/1996 |
|---|---|---|---|
| SU | 1004695 A | * | 3/1983 |

* cited by examiner

*Primary Examiner*—Vicky A. Johnson
(74) *Attorney, Agent, or Firm*—Browns & Michaels, PC; Greg Dziegielewski

(57) ABSTRACT

A chain guide with Multiple Joints having a plurality of sections (62, 64, 66) with each section conjoined together via a link (68) is provided. Each of the plurality of sections (62, 64, 66) has a partial upper side (12i) which forms, in part, an upper side of the chain guide. All of the partial upper side (12i) of the plurality of sections (62, 64, 66) together form the upper side of the chain guide.

3 Claims, 5 Drawing Sheets

COMPLIANT CHAIN GUIDE WITH MULTIPLE JOINTS

FIELD OF THE INVENTION

This invention relates to a chain guide for guiding drive chains and more particularly, the invention pertains to compliant chain guide with multiple joints. The chain guides of the preferred embodiment of the present invention are designed for use as chain guides in engine timing systems.

BACKGROUND OF THE INVENTION

Conventional engine timing systems consist of a crankshaft and corresponding sprocket system which operate an engine with either single or dual overhead camshafts. The operation of a conventional engine system is based upon a chain which extends from the crankshaft to the camshaft (or camshafts) and returns to the crankshaft in an endless loop. The movement of the crankshaft and the chain causes the camshaft to rotate. Alternatively, a separate chain can drive between the two camshafts of each bank of cylinders in a dual overhead camshaft engine timing system. Examples of engine timing systems are shown in U.S. Pat. No. 5,427,580, entitled "Phased Chain Assemblies", which is incorporated herein by reference.

As the chain extends in an endless loop between the driving and the driven sprockets, such as those located on a crankshaft (driving shaft) and camshaft (driven shaft), the chain forms a "tight" side and a "slack" side. The "tight" side is formed by the tension in the span of chain between the links entering the driving sprocket and the links leaving the driven sprocket. A "slack" side is formed on the other span of chain between the links leaving the driving sprocket and entering the driven sprocket.

The performance and action of the chain differs between the tight and slack sides. A chain tensioner is conventionally used on the slack side of the chain. The tensioner acts to take up or eliminate the slack in the chain. As the engine accelerates or decelerates, the tensioner arm may move closer to the chain to maintain the tension, i.e., eliminate the slack in the chain. The tensioner arm typically includes a convex surface to match the path of the chain. In the use of the chain tensioner on the slack side of the chain, the tensioner arm is subject to vibrations and forces from the sudden acceleration and deceleration of the engine. Such vibration can cause wear on a tensioner arm surface.

In contrast, a chain guide is conventionally used on the tight side of the chain. Such a guide is typically designed to remain fixed, as the chain portion remains tight between the two sprockets. The guide serves to maintain the desired path of the chain between the sprockets.

FIG. 1 depicts a prior art chain guide with tapered side rails. The illustration shows only a single engine bank of the engine timing system. The engine system consists of a crankshaft 20 and corresponding sprocket 21 and a sprocket 31 mounted on camshaft 30. As explained above, a chain guide may be used with other engine timing systems. The key is to use the chain guide on the tight side of an endless chain.

The engine timing system 10 includes chain 40, chain tensioner system 50, and chain guide 1. The engine chain 40 extends from the crankshaft 20 to the camshaft 30 and returns to the crankshaft 20 in an endless loop. The movement of the crankshaft 20 causes the sprocket 21 to rotate which, in turn, causes sprocket 31 and camshaft 30 to rotate.

The crankshaft sprocket 21 is the driving sprocket and thus the tight side 43 of the chain is formed between the links entering the crankshaft sprocket and leaving the camshaft sprocket 31. The slack side 41 is the opposite side of the chain between the two sprockets 21, 31.

The slack side has a chain tensioner system 50. The tensioning system 50 is designed to maintain the tension on the slack side of the chain. The tight side 43 of the chain 40 has a chain guide 1 to keep the chain in position. The chain guide 1 is positioned so that its upper side 12 is against the underside 42 of the chain 40. The chain 40 is forced into motion by the sprockets 21 and 31, resulting in its movement across or through the groove of the chain guide 1 along a direction of travel of the endless chain.

Consideration of information disclosed by the following U.S. Patents, which are all hereby incorporated by reference, is useful when exploring the background of the present invention.

U.S. Pat. No. 5,779,582 entitled CHAIN GUIDE with tapered side rails teaches a chain guide, which will be utilized on the tight side of the chain of an engine system, is designed to reduce the lateral motion of the chain. The chain guide is constructed with raised side rails that taper inward to the center. The slot which guides and controls the chain gradually narrows towards the center.

Japanese patent application JP8004848(A2), entitled TENSIONER ARM AND CHAIN GUIDE, teaches a tensioner arm and a chain guide by which deterioration of properties of engine oil can be prevented.

U.S. Pat. No. 6,322,471, entited CHAIN GUIDE teaches a chain guide which includes an angle-like guide base having a single mounting portion bolted to a mount surface on the interior side of an endless chain and projecting to the exterior side of the chain through a space defined between the chain and the mount surface. A shoe supporting portion of the angle guide base projects perpendicularly from an exteriorly projecting end of the mounting portion and is provided with a plurality of nose locking projections spaced in a direction of travel of the chain. A guide shoe is provided with a plurality of generally hook-shaped resilient locking prongs projecting from a rear surface on a side opposite to a shoe surface. The locking prongs are snap-fitted with the locking projections to attach the guide shoe to the guide base with the shoe supporting portion held between the rear surface of the guide shoe and the locking prongs. The angle guide base is highly rigid and hence is able to suppress vibration and noises generated while the chain is running. The mounting portion of the guide base, which is disposed interiorly of the endless chain, does not increase the overall size of an apparatus to which the chain guide is mounted.

U.S. Pat. No. 6,312,353, entitled CHAIN GUIDE, teaches a chain guide for guiding a chain includes an elongated chain guide body pivotally connected at one end to a fixed support member and having an aperture formed in an opposite end of the chain guide body, and a collar loosely fitted in the aperture in such a manner that a clearance is defined between the chain guide body and the collar at least on that side of the collar which is aligned with a direction of pivotal movement of the chain guide body. The collar is firmly secured to the fixed support member so that the chain guide body is allowed to pivot within the range of the clearance. With the clearance thus provided, the chain is protected against excessive tightening or loosening which may otherwise occur when the chain guide is mounted on the fixed support member.

U.S. Pat. No. 5,665,019 entitled CHAIN GUIDE MOUNTING ASSEMBLY FOR THE REDUCTION OF CHAIN INDUCED NOISE AND VIBRATION IN A CHAIN DRIVEN OVERHEAD CAM INTERNAL COMBUSTION ENGINE teaches a chain guide mounting assembly for reducing chain related noise in a chain driven overhead cam internal combustion engine. The assembly includes vibration isolation means for mounting the chain guide to the engine. Resilient members, fitted within the chain guide, provide the vibration isolation, which, in turn, reduces undesirable chain noise. To prevent undue lateral movement of the chain guide member as a result of the chain force exerted thereon, a rigid sleeve in interference engagement is fitted within bores of the resilient members. As a result, a preload is provided on the resilient members so as to reduce the amount of undesirable lateral movement.

All of the above cited publications have a common characteristic, which is the upper side 12 of chain guide 1 is formed out of a single piece or member. The present invention teaches a chain guide which has an upper side that is formed out of at least two members.

SUMMARY OF THE INVENTION

A chain guide is provided that has a plurality of members conjoined together. Each member has a surface which forms, in part, an upper side of the chain guide. The plurality of conjoined members together forms the upper side of the chain guide.

A plurality of sectioned chain guide is provided, in which each section hinges with the other section to provide compliance. These hinges are backed by a set of springs that provides force into the chain.

A multiple sectioned chain guide that has modular sections for low cost design is provided.

A multiple sectioned chain guide that has modular sections for damping a chain drive is provided.

A chain guide with multiple joints having a plurality of sections with each section conjoined together via a link is provided. Each of the plurality of sections has a partial upper side which forms, in part, an upper side of the chain guide. All of the partial upper side of the plurality of sections together form the upper side of the chain guide.

DESCRIPTION OF THE PREFERRED EMBODIMENT

Figure 2:
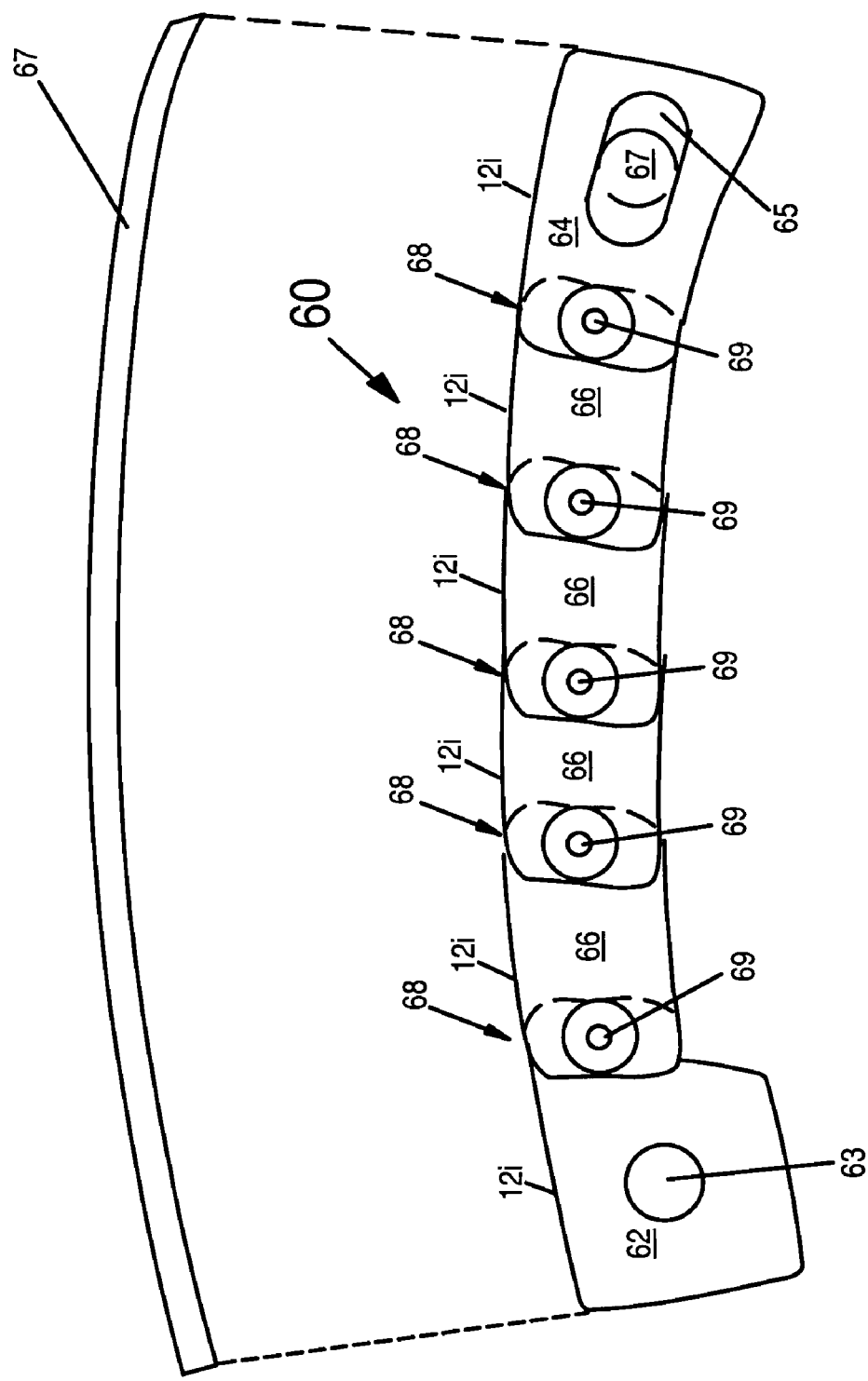
FIG. 2 shows a conjoined chain guide of the present invention.

Referring to FIG. 2, a conjoined chain guide 60 of the present invention is shown. Chain guide 60 has a first end section 62 and a second end section 64. First end section 62 has an annular opening 63 for receiving a bolt (not shown) such as a shoulder bolt for allowing pivoting to occur. Second end section 64 has an elongated opening 65 which allows a bolt 67 (shown in broken lines) fastened therein to be smaller than the elongated opening 65. This way, an allowance for translational movement exists for the chain guide due to the physical shape of the elongated opening 65 thereby chain guide 60 as a whole may adjust itself somewhat given the physical shape of the elongated opening 65. Chain guide 60 may have at least one intermediate section 66. Or typically, the chain guide may have a plurality of intermediate sections 66. It is noted that the present invention includes the possibility of having only two sections conjoined together. For example, conjoined chain guide 60 may only consisted of first end section 62 and second end section 64 conjoined together with no intermediate section 66 interposed therebetween.

Figure 1:
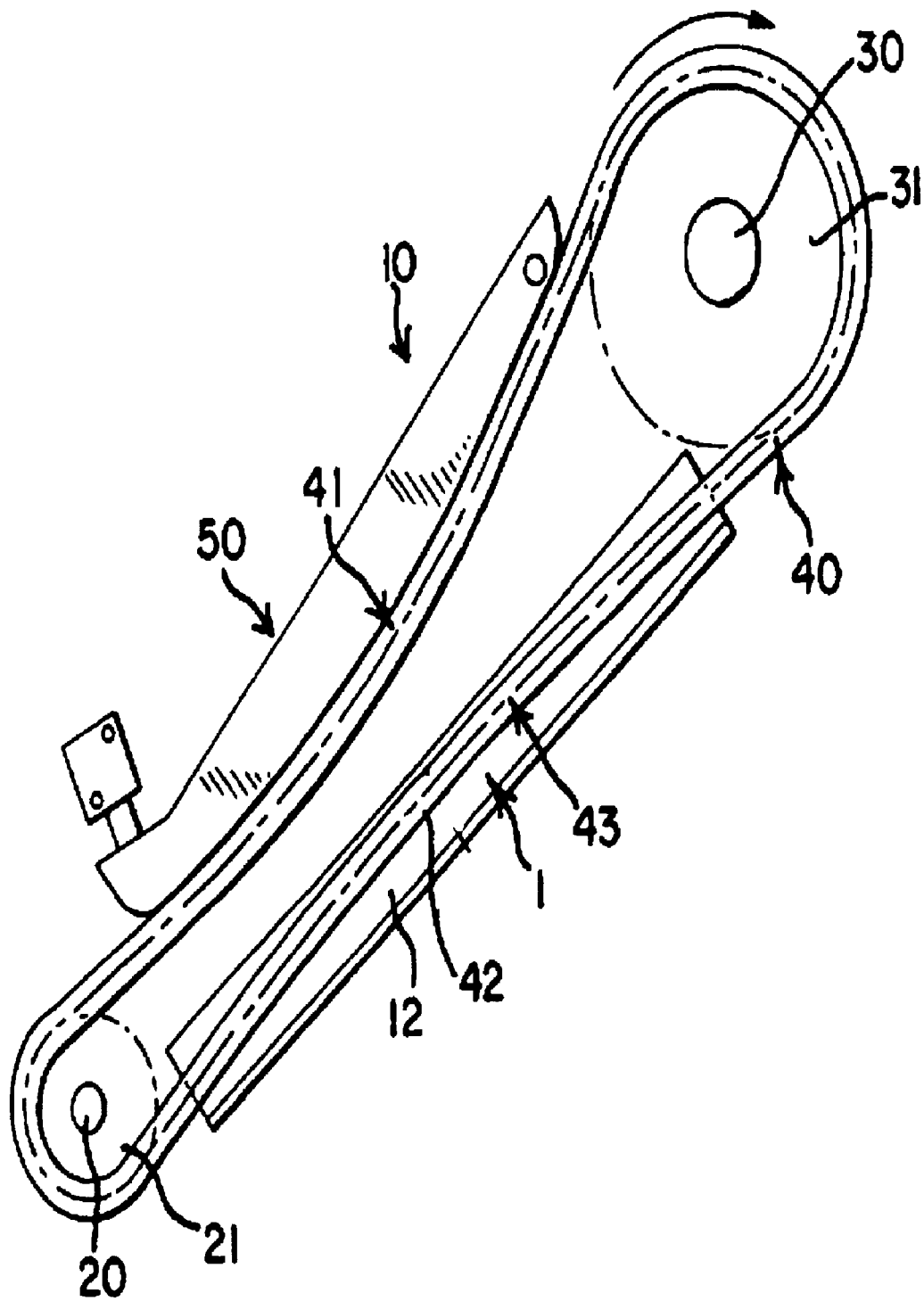
FIG. 1 shows a side view of a prior art power transmission chain and guide system in an engine between the crankshaft and one camshaft.

Each section 62, 64, 66 may be made out of steel stampings. Alternatively, sections 62, 64, 66 may be made out of molded plastic components. The sections 62, 64, 66 are hinged together via hinges 68. A pin 69 is positioned as the actual hinge to conjoined sections 62, 64, 66. Each section of the sections 62, 64, 66 has a partial upper side 12$i$, where i is a positive integer, i.e. 1, 2, . . . i . . . n. All the partial upper side, $\Sigma 12i$ together form the upper side of the conjoined chain guide 60 such as the upper surface 12 in FIG. 1. in other words, the conjoined chain guide of a plurality of sections together forms an equivalent of a prior art upper surface. One distinguishing point of the present invention with that of the prior art is that a number of sections are conjoined to form a chain guide. This way an allowance for some compliance via a spring mechanism is achieved. Compliance is a minute change in shape of a first member for accommodating its engagement with a second member. Different sections is not the prior art chain guide where only a single member serves the purpose of multiple members of the present invention.

For sections that are made out of steel stampings, a molded plastic face 67 or shoe is typically required to cover the combination of all partial upper side, $\Sigma 12i$. The face typically consists of a single member.

Figure 3:
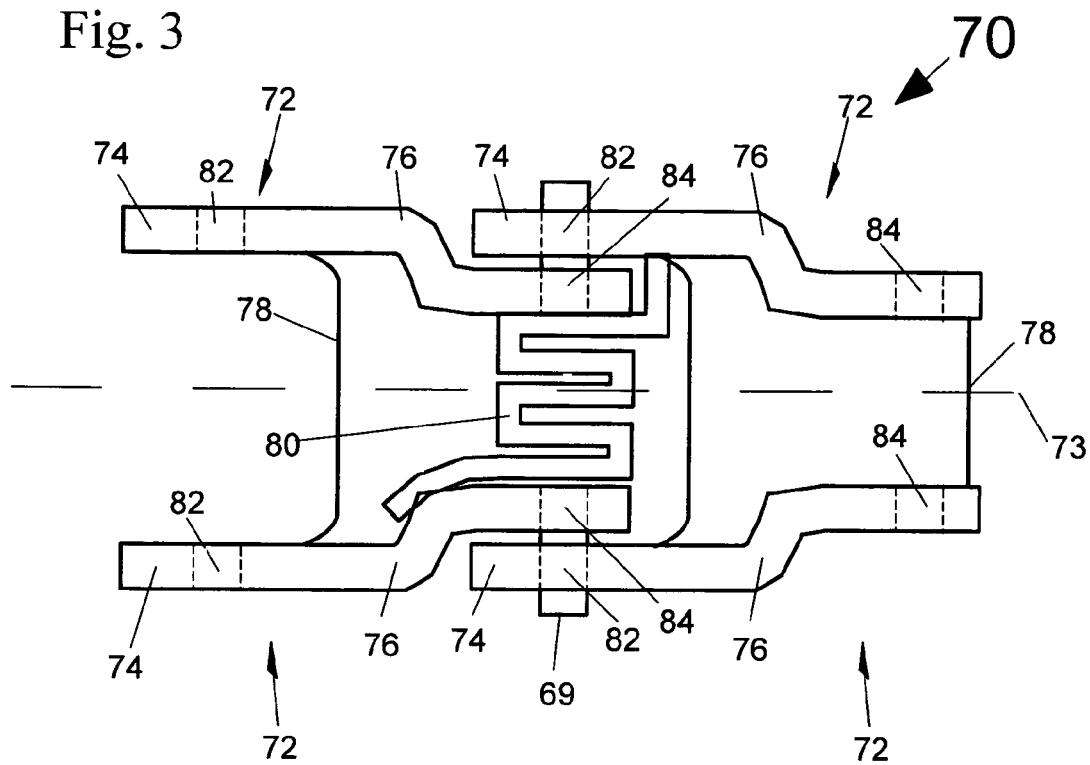
FIG. 3 shows a bottom view of the conjoined chain guide of the present invention.

Referring to FIG. 3, a bottom view of the link 68 linking two adjacent sections 66 is shown. Note that the link 68 between section 66 and first end section 62, or between section 66 and second end section 64 are identical. The difference is in the physical shape of the sections individually, but the link is identical. Similarly, first end section 62 and second end section 64 may be linked together by a link that is identical to link 68.

Each section 66 has a pair of ridges 72. Each ridge 72 forms a lateral side of section 66 and is the outer limit of the lateral side. One ridge 72 is symmetrical to the other in relation to a center line 73 along the travel of an endless chain (not shown). Section 66 has two legs 74 each forming an extension of each of the pair of ridges 72. On each leg 74, an annular aperture is formed thereon for receiving pin 69. Each ridge 72 has curved band portion 76 which results in a narrower portion of section 66 to thereby accommodate the linking of one section to its adjacent section.

A continuum 78 that is part of section 66 is formed between ridges 72. Continuum 78, together with the pair of ridges 72 defines a three dimensional space for accommodating or the placing of a link element such as one or more springs 80. The spring 80 may be a solid or a wound torsion, helical, leaf, or similar type of spring that provides compliance. More specifically, with regard to the three dimensional space, only part of the pair of ridges 72 together with a first surface of continuum 78 defines the same. The part of the pair of ridges 72 includes part of legs 74, and the rest of the ridges 72 including the curved bands 76.

On the pair of ridges 72 there are two pairs of apertures for receiving pin 69 per pair of aperture. The two pairs of apertures include a first pair of aperture 82 which is formed on legs 74, and a second pair 84 formed on the opposite end of the ridge 72 in relation to the legs 74. Aperture 82 may be square in shape.

Figure 4:
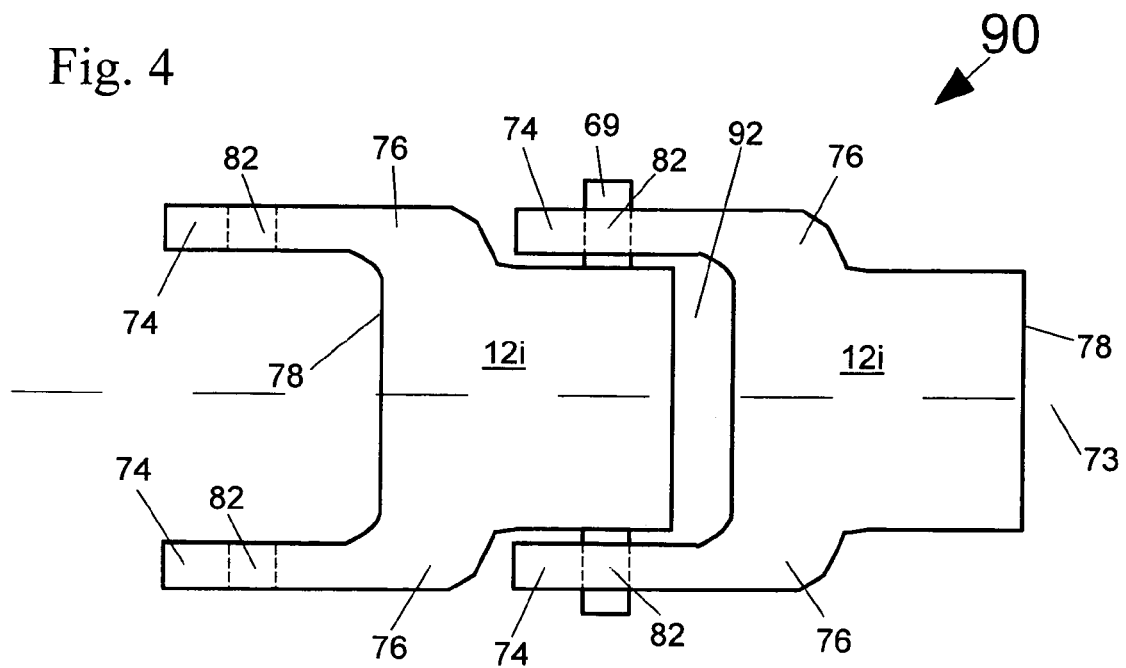
FIG. 4 shows a top view of the conjoined chain guide of the present invention.

Referring to FIG. 4, a top view of a top view of the conjoined chain guide 68 is shown. A second surface 12*i* is formed as the opposite surface of the first surface of continuum 78. Second surface 12*i* is more extensive than the opposite first surface of continuum 78 since second surface 12*i* extends over the pair of ridges 72. Ideally each second surface 12*i* forms a continuous surface such as surface 12 of FIG. 1. However, in practice, there may be a gap 92 which exists between adjacent second surfaces 12*i*. Preferably gap 92 should be formed as narrow as that which is practical. However, there may be advantages of having a suitable gap such that lubricating fluid may flow through it.

The physical shape of the first end section 62 and second end section 64 can be of any suitable shape or formation known to the art of chain guide. Typically, the shape is identical to the relevant section of a known single member chain guide.

As can be appreciated, this device incorporates multiple sections of elements made out of rigid components of such materials as steel stampings or molded plastic components that hinge together to thereby allow some change of shape. These hinges 68 are backed by a spring that provides support and compliance. The present invention provides a compliant chain guide that is modular in formation and thereby having the characteristic of low cost design and also provides additional damping for the chain drive as a whole.

Chain drive applications that require chain guides usually use rigid components. This device incorporates multiple sections of steel stampings or molded plastic components that are hinged with respect to each other. Those hinges are integrated with a solid or wound torsion, helical, leaf, or similar spring that provides compliance. Stamped steel components would require an additional plastic wear surface, possibly plastic or an elastomer which would be held to the steel base by a slot, a series of clips, or a similar method. Plastic molded components may not require a wear surface. Some sections (typically the end sections) can be hinged or bolted to the mounting surface, or may have a sliding contact. The advantage of the compliant chain guide is a modular low cost design and the addition of damping for the chain drive.

Figure 5:
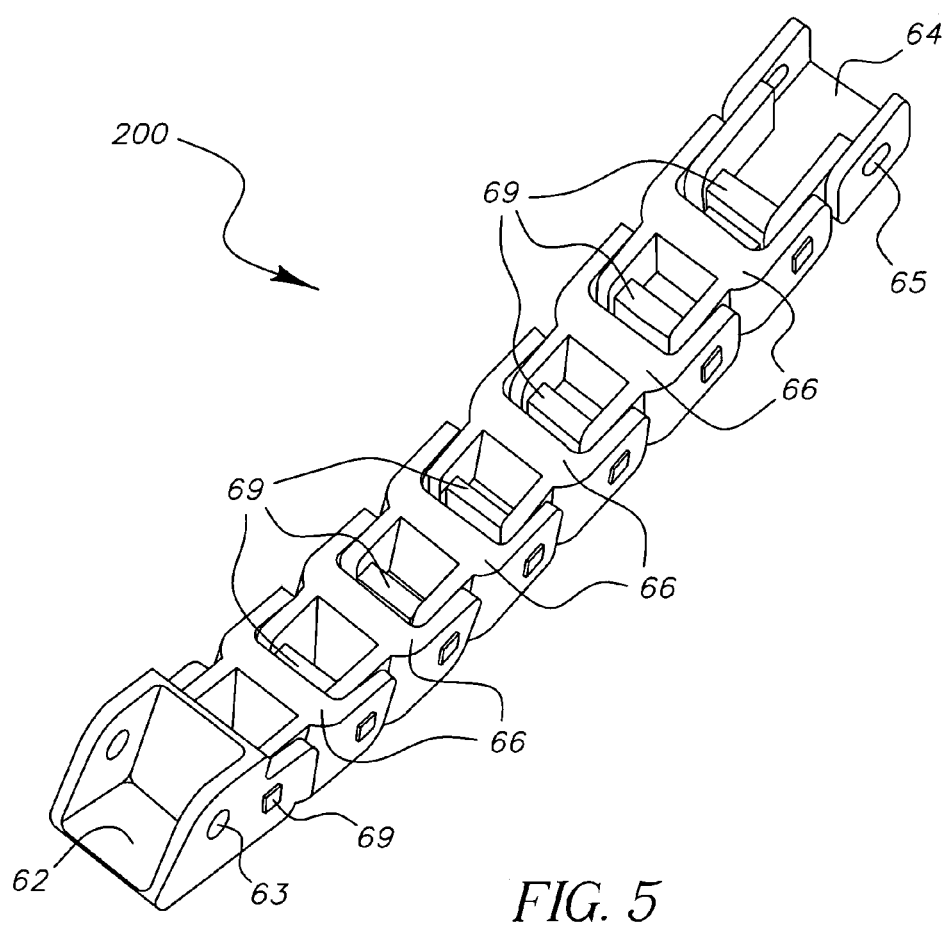
FIG. 5 shows a bottom perspective view of the conjoined chain guide of the present invention.
Figure 6:
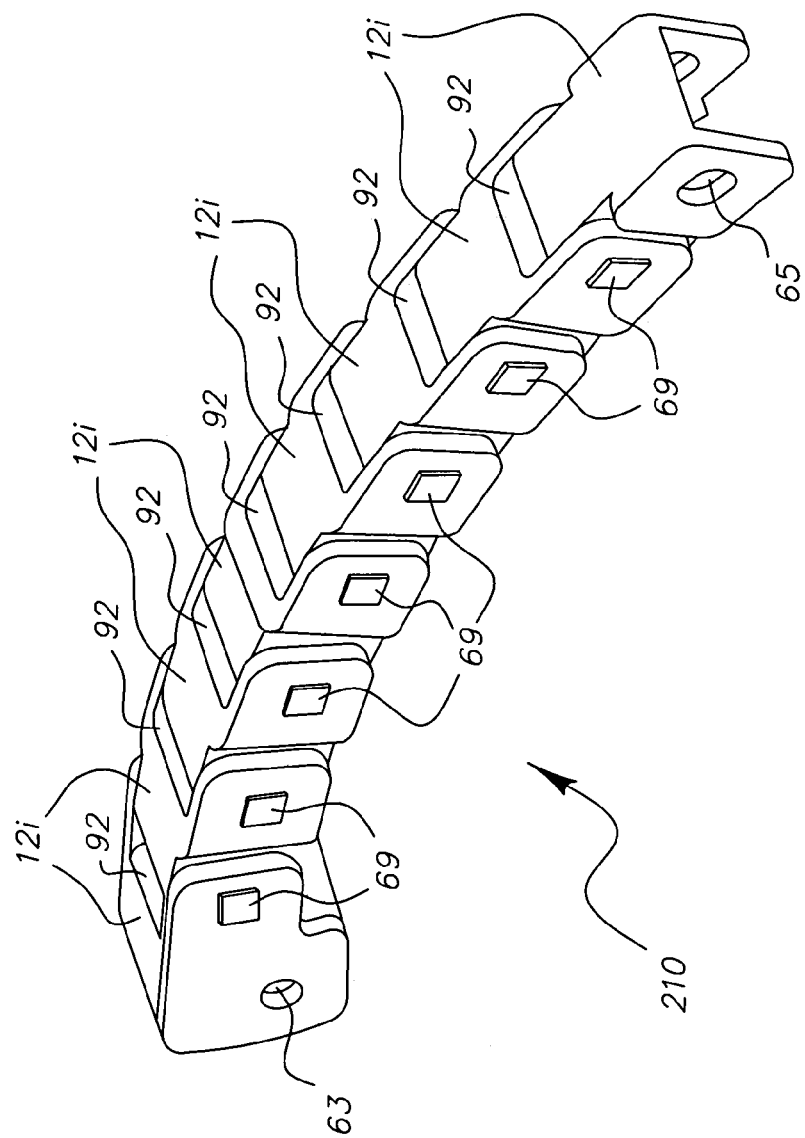
FIG. 6 shows a top perspective view of the conjoined chain guide of the present invention.

Referring to FIGS. 5 and 6, two perspective views of the present invention are shown. Referring specifically to FIG. 5, a bottom perspective view 200 of an embodiment of the present invention is shown. Sections 62, 64, and 66 are conjoined together by square pin 69.

Referring specifically to FIG. 6, a top perspective view 210 of the present invention is shown. Other than the corresponding elements or members shown in FIG. 5, note that each of the sections provides a partial upper sides 12*i* which forms the whole upper side Σ12*i*. Gaps 92 may exist between the partial upper sides 12*i*. Elongated end 65 forms an extension of section 64. Annular opening 63 is formed on section 62. Elongated opening 65 is formed on section 66.

Alternatively, an elastic element may be a torsion bar mounted within the chain guide.

Accordingly, it is to be understood that the embodiments of the invention herein described are merely illustrative of the application of the principles of the invention. Reference herein to details of the illustrated embodiments are not intended to limit the scope of the claims, which themselves recite those features regarded as essential to the invention.

What is claimed is:

1. A chain guide (60) or tensioner arm comprising:
   a plurality of identical, independently moveable sections (62, 64, 66) with each section joined to adjacent sections via link portions (68) comprising a spring (80) associated with a pin to maintain shape and compliance with use;
   each of the plurality of sections (62, 64, 66) having a partial upper side (12*i*) all of the partial upper sides (12*i*) of the plurality of sections (62, 64, 66) together forming a chain contact face of the chain guide; and
   an end piece arranged at least on one end of the plurality of sections for mounting the chain guide or tensioner arm to a bracket.

2. The chain guide or tensioner of claim 1, wherein the plurality of sections (62, 64, 66) are steel with a plastic wear surface.

3. The chain guide or tensioner of claim 1, wherein the plurality of sections (62, 64, 66) are plastic.

* * * * *